(12) United States Patent
Morita

(10) Patent No.: US 11,919,420 B2
(45) Date of Patent: Mar. 5, 2024

(54) POWER SUPPLY SYSTEM

(71) Applicant: DENSO CORPORATION, Kariya (JP)

(72) Inventor: Tetsuo Morita, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/720,787

(22) Filed: Apr. 14, 2022

(65) Prior Publication Data

US 2022/0234471 A1 Jul. 28, 2022

Related U.S. Application Data

(63) Continuation of application No. PCT/JP2020/038534, filed on Oct. 12, 2020.

(30) Foreign Application Priority Data

Oct. 15, 2019 (JP) ................... 2019-188873

(51) Int. Cl.
*B60L 58/19* (2019.01)
*B60L 3/00* (2019.01)
*B60L 3/04* (2006.01)
*B60L 50/64* (2019.01)

(52) U.S. Cl.
CPC ............. *B60L 58/19* (2019.02); *B60L 3/0046* (2013.01); *B60L 3/04* (2013.01); *B60L 50/64* (2019.02)

(58) Field of Classification Search
CPC ........ B60L 58/19; B60L 50/64; B60L 3/0046; B60L 3/04
See application file for complete search history.

(56) References Cited

U.S. PATENT DOCUMENTS

| 9,045,052 | B2* | 6/2015 | Girard | .................... B60L 58/13 |
| 2019/0131804 | A1* | 5/2019 | Taniguchi | ............. B60R 16/033 |
| 2019/0256018 | A1* | 8/2019 | Taoka | ..................... B60L 58/19 |
| 2020/0216002 | A1 | 7/2020 | Mazaki et al. | |

FOREIGN PATENT DOCUMENTS

JP 2018-182864 A 11/2018

* cited by examiner

*Primary Examiner* — Jared Fureman
*Assistant Examiner* — Duc M Pham
(74) *Attorney, Agent, or Firm* — Oliff PLC

(57) ABSTRACT

A power supply system includes: an inter-load switch including a first switch and a second switch connected in series, a voltage generation unit, an electric storage device connected between the first switch and the second switch, a first state control unit configured to select a first state in which power is supplied from at least one of the voltage generation unit or the electric storage device to a first load and a second load, and a second state control unit configured to, when determining that a failure has occurred, select a second state in which power is supplied from the electric storage device to a load on a side of a no-failure-occurrence system in which no failure has occurred, by turning off a switch on a side of a failure-occurrence system in which a failure has occurred and turning on a switch on a side of the no-failure-occurrence system.

3 Claims, 10 Drawing Sheets

POWER SUPPLY SYSTEM

CROSS-REFERENCE TO RELATED APPLICATION

The present application is a continuation application of International Application No. PCT/JP2020/038534, filed on Oct. 12, 2020, which claims priority to Japanese Patent Application No. 2019-188873 filed on Oct. 15, 2019. The contents of these applications are incorporated herein by reference in their entirety.

BACKGROUND

Technical Field

The present disclosure relates to a power supply system to be applied to a mobile object.

Background Art

In recent years, a power supply system which is applied to a vehicle and which can control behavior of the vehicle is known. In this power supply system, if a failure occurs in a load such as, for example, an electric brake device and an electric steering device that implements functions necessary for driving of a vehicle during driving of the vehicle, and all the functions are lost due to the failure, driving of the vehicle cannot be continued. A device including a first load and a second load as loads that implement one function to prevent loss of all functions even upon occurrence of a failure during driving of the vehicle is known.

SUMMARY

In the present disclosure, provided is a power supply system as the following.

The power supply system includes: an inter-load switch provided on a connection path that connects a first load and a second load and including a first switch and a second switch connected in series, a voltage generation unit connected to the connection path on a side closer to the first load than the inter-load switch and configured to generate an operating voltage of the first load and the second load, an electric storage device connected between the first switch and the second switch, a first state control unit configured to select a first state during driving, the first state being a state in which power is supplied from at least one of the voltage generation unit or the electric storage device to the first load and the second load; a failure determination unit configured to determine whether a failure has occurred in a first load system or a second load system during driving, the first load system being on a side closer to the first load than the inter-load switch and the second load system being on a side closer to the second load than the inter-load switch; and a second state control unit configured to: in a case where the failure determination unit determines that a failure has occurred, select a second state in which power is supplied from the electric storage device to a load on a side of a no-failure-occurrence system, by turning off a switch on a side of a failure-occurrence system out of the first switch and the second switch and turning on a switch on a side of the no-failure-occurrence system out of the first switch and the second switch, and of the first load system and the second load system, a system in which a failure has occurred serving as the failure-occurrence system, and a system in which no failure has occurred serving as the no-failure-occurrence system.

BRIEF DESCRIPTION OF THE DRAWINGS

The above and other objects, features and advantages of the present disclosure will become more clear from the following detailed description with reference to the accompanying drawings, in which.

DETAILED DESCRIPTION OF THE PREFERRED EMBODIMENTS

Figure 1:
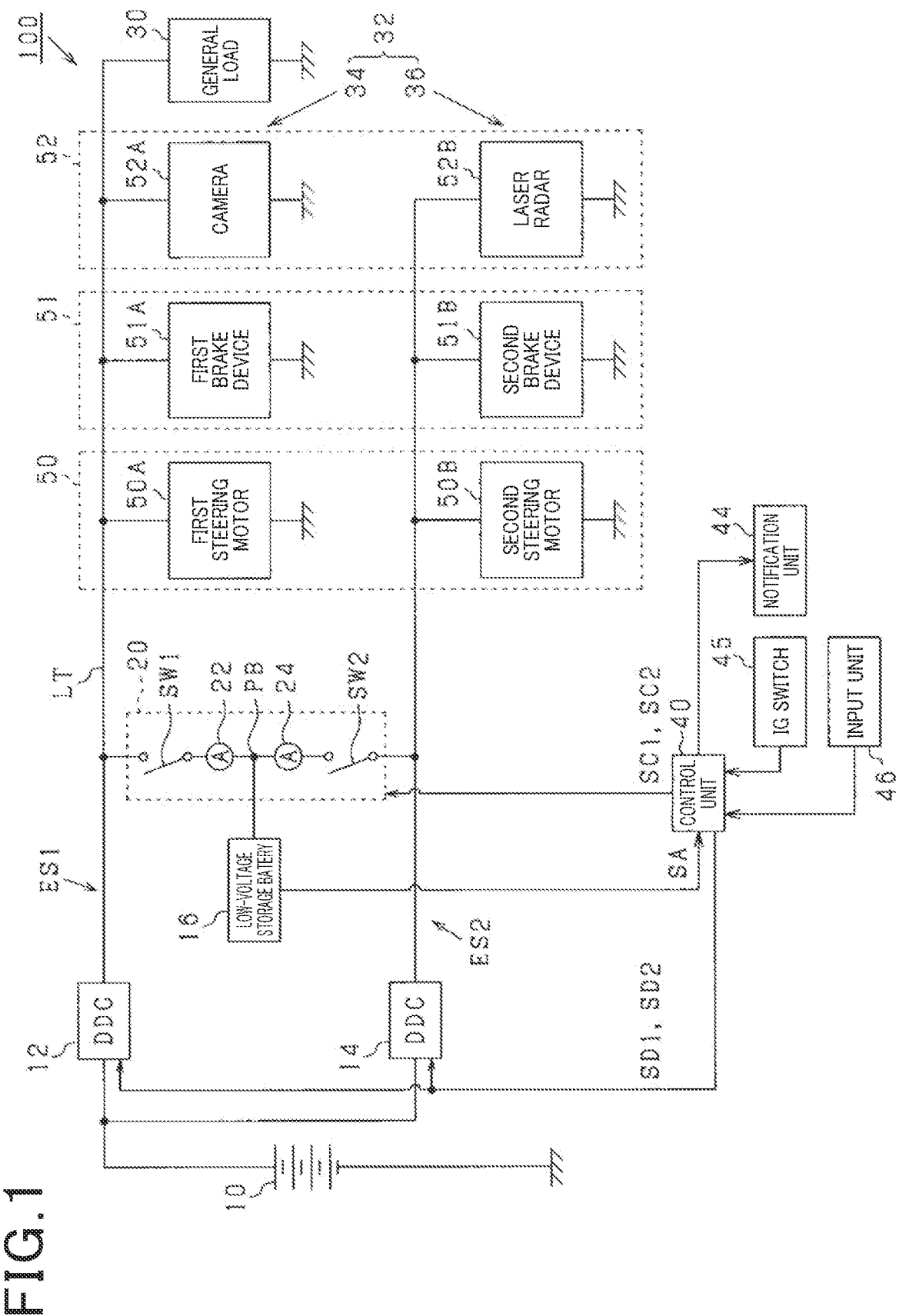
FIG. 1 is an overall configuration diagram of a vehicle-mounted power supply system according to a first embodiment.

For example, in PTL 1, an inter-load switch is provided on a connection path that connects a first load and a second load. A DC-DC converter that generates an operating voltage of each load is provided in a first load system on a side closer to the first load than the inter-load switch, and an electric storage device is provided in a second load system on a side closer to the second load than the inter-load switch. The inter-load switch is turned off when a failure occurs in one system. This enables continuation of driving of the vehicle by securing functions necessary for driving of the vehicle by the load on a side of the system in which no failure has occurred.

[PTL 1] JP 2018-182864 A

By the way, in a case where a failure has occurred in a second load system during driving of a vehicle, driving is performed by a first load. In this event, power is supplied to the first load only from a DC-DC converter. The DC-DC converter generates an operating voltage and then outputs the operating voltage, and thus, responsiveness to power supply is low, and, for example, it is difficult to perform power supply with less voltage fluctuation to a load with a large inrush current such as an electronic power steering system, which inhibits smooth driving of the vehicle. If, for example, an electric storage device is provided also in the first load system to perform power supply with less voltage fluctuation, a configuration of a power supply system becomes complicated. Note that such a problem does not only arise in a vehicle, but the problem is also common to a mobile object such as a ship and an air vehicle (for example, a drone).

The present disclosure has been made to solve the above-described problem, and an object of the present disclosure is to provide a power supply system that can achieve power supply with less power fluctuation even upon occurrence of a failure while simplifying a configuration of the power supply system.

A first means for solving the above-described problem is a power supply system to be applied to a mobile object and including a first load and a second load as loads that implement at least one function necessary for driving of the mobile object, the power supply system includes: an inter-load switch provided on a connection path that connects the first load and the second load and including a first switch and a second switch connected in series, a voltage generation unit connected to the connection path on a side closer to the first load than the inter-load switch and configured to generate an operating voltage of the first load and the second load, an electric storage device connected between the first switch and the second switch, a first state control unit configured to select a first state during driving, the first state being a state in which power is supplied from at least one of the voltage generation unit or the electric storage device to the first load and the second load; a failure determination unit configured to determine whether a failure has occurred in a first load system or a second load system during driving, the first load system being on a side closer to the first load than the inter-load switch and the second load system being on a side closer to the second load than the inter-load switch; and a second state control unit configured to: in a case where the failure determination unit determines that a failure has occurred, select a second state in which power is supplied from the electric storage device to a load on a side of a no-failure-occurrence system, by turning off a switch on a side of a failure-occurrence system out of the first switch and the second switch and turning on a switch on a side of the no-failure-occurrence system out of the first switch and the second switch, and of the first load system and the second load system, a system in which a failure has occurred serving as the failure-occurrence system, and a system in which no failure has occurred serving as the no-failure-occurrence system.

A power supply system to be applied to the mobile object includes a system in which a first load and a second load are provided as loads that implement at least one function necessary for driving of the mobile object. In this means, power can be supplied from each of the voltage generation unit and the electric storage device to the first load and the second load during driving of the mobile object. Thus, power can be stably supplied over a long period of time. In other words, power supply from the voltage generation unit enables continuous power supply even during driving of a long period of time, and power supply from the electric storage device enables power supply with less voltage fluctuation.

Further, the inter-load switch is provided on the connection path that connects the first load and the second load, and in a case where a failure occurs in one of the first load system or the second load system, at least one of the first switch or the second switch included in the inter-load switch is turned off. This enables continuation of driving of the mobile object by securing functions necessary for driving of the mobile object by the load on a side of the no-failure-occurrence system in which no failure has occurred.

In other words, while power is supplied only to the load in one system out of the first load system and the second load system upon occurrence of a failure in one system during driving, according to this means, power can be supplied to the loads in both systems from the electric storage device. Thus, even if a failure occurs at an arbitrary timing during driving, it is possible to suitably handle the failure. Specifically, the electric storage device is connected between the first switch and the second switch, and thus, even in a case where a failure occurs in one of the systems, it is possible to perform power supply with less voltage fluctuation to a load on a side of the no-failure-occurrence system in which no failure has occurred, so that it is possible to simplify a configuration compared to a configuration in which electric storage devices are provided for each system. It is therefore possible to achieve power supply with little fluctuation in power even upon occurrence of a failure while simplifying a configuration of a power supply system.

In a second means, the voltage generation unit is a first voltage generation unit, and the power supply system further includes a second voltage generation unit connected to the connection path in the second load system and configured to generate the operating voltage.

In this means, the voltage generation units are provided in both the first load system and the second load system. Thus, even upon occurrence of a failure in anyone of the systems, continuous power supply can be performed by power supply from the first voltage generation unit or the second voltage generation unit, so that it is possible to continue driving of the mobile object.

In a third means, the electric storage device is a first electric storage device, the power supply system further includes a second electric storage device connected to the connection path in the first load system, the first state is a state in which the first switch on a side of the first load system is in an off state, and the second switch on a side of the second load system is in an on state, and the second state control unit is configured to: maintain the off state of the first switch and maintain the on state of the second switch in a case where the failure determination unit determines that a failure has occurred in the first load system, and turn off the second switch and then turn on the first switch in a case where the failure determination unit determines that a failure has occurred in the second load system.

In this means, the second voltage generation unit is provided in the second load system, and the second electric storage device is provided in the first load system. This eliminates the need to supply power from the first voltage generation unit to the second load and the need to supply power from the first electric storage device to the first load. It is therefore possible to select the first state in which the first switch is in an off state and the second switch is in an on state during driving of the mobile object. In this first state, when a failure occurs in the first load system, the off state of the first switch is maintained, and the on state of the second switch is maintained. In other words, it is possible to prevent the failure occurring in the first load system from affecting the second load system without switching the states of the first switch and the second switch. Further, when a failure occurs in the second load system, the second switch is turned off, and then, the first switch is turned on. By turning off the second switch first, it is possible to suitably prevent the failure occurring in the second load system from affecting the first load system, and by turning on the first switch thereafter, it is possible to effectively utilize the first electric storage device even when a failure occurs in the second load system.

In a fourth means, in a case where the failure determination unit determines that a failure has occurred in the first load system or the second load system, the voltage generation unit is configured to decrease power supply to the failure-occurrence system in which a failure has occurred.

In this means, when a failure has occurred in a load system, power supply to the failure-occurrence system in which a failure has occurred is decreased. This can prevent influence of a failure in the failure-occurrence system in which a failure has occurred while continuing driving of the mobile object using the no-failure-occurrence system in which no failure has occurred.

In a fifth means, the first switch and the second switch are semiconductor switches and include parasitic diodes connected in parallel so that directions toward the electric storage device become forward directions.

In this means, the first switch and the second switch include the parasitic diodes connected in parallel so that the directions toward the electric storage device become forward directions. This enables the voltage generation unit to charge the electric storage device via the parasitic diode provided in the first switch regardless of the state of the first switch. Further, the forward directions of the parasitic diodes provided in these elements are opposite directions, so that it is possible to prevent conduction between the first load system and the second load system via these parasitic diodes.

In a six means, the mobile object is capable of traveling by manual driving and autonomous driving, the first state control unit is configured to select the first state during autonomous driving, the failure determination unit is configured to determine whether a failure has occurred in the first load system or the second load system during autonomous driving, and the power supply system further comprises a driving control unit configured to switch driving from autonomous driving to manual driving in the second state.

A power supply system to be applied to the mobile object that can travel by manual driving and autonomous driving includes a power supply system in which a first load and a second load are provided as loads that implement at least one function necessary for autonomous driving. In this means, in a case where a failure has occurred in one of the first load system or the second load system during autonomous driving, at least one of the first switch or the second switch included in the inter-load switch is turned off so as to cause driving to be switched from autonomous driving to manual driving. This enables driving to be switched to manual driving while securing functions necessary for autonomous driving by the load on the side of the no-failure-occurrence system in which no failure has occurred.

A seventh means is a power supply system to be applied to a mobile object and including a first load and a second load as loads that implement at least one function necessary for driving of the mobile object, the power supply system includes an inter-load switch provided on a connection path that connects the first load and the second load and including a first switch and a second switch connected in series, a voltage generation unit connected to the connection path on a side closer to the first load than the inter-load switch and configured to generate an operating voltage of the first load and the second load, an electric storage device connected between the first switch and the second switch, a first state control unit configured to select a first state during driving, the first state being a state in which power is supplied from at least one of the voltage generation unit or the electric storage device to the first load and the second load; an information acquisition unit configured to acquire failure information indicating that a failure has occurred in a first load system or a second load system during driving, the first load system being on a side closer to the first load than the inter-load switch and the second load system being on a side closer to the second load than the inter-load switch; and a second state control unit configured to: in a case where failure information is acquired by the information acquisition unit, select a second state in which power is supplied from the electric storage device to a load on a side of a no-failure-occurrence system, by turning off a switch on a side of a failure-occurrence system out of the first switch and the second switch and turning on a switch on a side of the no-failure-occurrence system out of the first switch and the second switch, and of the first load system and the second load system, a system in which a failure has occurred serving as the failure-occurrence system, and a system in which no failure has occurred serving as the no-failure-occurrence system.

Also in this means, in a similar manner to the first means, it is possible to achieve power supply with little fluctuation in power even upon occurrence of a failure while simplifying a configuration of a power supply system.

First Embodiment

A first embodiment of a power supply system according to the present disclosure will be described below with reference to the drawings. In the present embodiment, a power supply system 100 is mounted to a vehicle that can travel by manual driving and autonomous driving.

As illustrated in FIG. 1, the power supply system 100, which is a system that supplies power to a general load 30 and a specific load 32, includes a high-voltage storage battery 10, a first DC-DC converter (hereinafter, a DDC) 12, a second DDC 14, a low-voltage storage battery 16, a switch unit 20 and a control unit 40.

The high-voltage storage battery 10 has a rated voltage (for example, several hundred volts) which is higher than a rated voltage of the low-voltage storage battery 16, and is, for example, a lithium-ion storage battery. The first and the second DDCs 12 and 14 convert power supplied from the high-voltage storage battery 10 to power of an operating voltage (for example, 12V) of the general load 30 and the specific load 32, and supply the power to the general load 30 and the specific load 32.

The general load 30 is an electric load (hereinafter, simply referred to as a load) not used for control of autonomous driving, and is, for example, an air conditioner, an audio device, a power window, or the like.

Meanwhile, the specific load 32 is a load to be used for control of autonomous driving, and is, for example, an electric power steering device 50 that controls steering of the vehicle, an electric brake device 51 that provides braking force to wheels, a traveling control device 52 that monitors circumstances around the vehicle, or the like.

Thus, if a failure occurs in the specific loads 32, and all functions of the specific loads 32 are lost, autonomous driving cannot be continued. To avoid this, the specific load 32 includes a first load 34 and a second load 36 redundantly provided for each function to prevent all functions from being lost even in a case where a failure has occurred. Specifically, the electric power steering device 50 includes a first steering motor 50A and a second steering motor 50B. The electric brake device 51 includes a first brake device 51A and a second brake device 51B. The traveling control device 52 includes a camera 52A and a laser radar 52B. The first steering motor 50A, the first brake device 51A and the camera 52A correspond to the first loads 34, and the second steering motor 50B, the second brake device 51B and the laser radar 52B correspond to the second loads 36.

While the first load 34 and the second load 36 implement one function in conjunction with each other, each of the first load 34 and the second load 36 can independently implement part of the function. For example, in the electric power steering device 50, the vehicle can be freely steered by the first steering motor 50A and the second steering motor 50B, and the vehicle can be steered by each of the steering motors 50A and 50B while a certain limitation is imposed on steering speed, a steering range, or the like.

Each specific load 32 implements functions of supporting control by a driver in manual driving and implements functions necessary for autonomous driving in autonomous driving in which behavior such as traveling and stop of the vehicle is automatically controlled. Thus, the specific load 32 can be also referred to as a load necessary for traveling of the vehicle.

The switch unit 20 as an inter-load switch is provided on a connection path LT that connects the first load 34 and the second load 36 and includes a first switch SW1 and a second switch SW2 that are connected in series. At the switch unit 20, the first switch SW1 is provided on a side closer to the first load 34 than the second switch SW2. In the present embodiment, an IGBT is used as each of the switches SW1 and SW2.

The first DDC 12 is connected to the connection path LT on a side closer to the first load 34 than the switch unit 20 and steps down and generates (hereinafter, simply referred to as generates) an operating voltage of the general load 30 and the first load 34. In the present embodiment, a first load system ES1 is provided by the first DDC 12 provided on a side closer to the first load 34 than the switch unit 20, the general load 30 and the first load 34. Note that in the present embodiment, the first DDC 12 corresponds to a "voltage generation unit, a first voltage generation unit".

Further, the second DDC 14 is connected to the connection path LT on a side closer to the second load 36 than the switch unit 20 and generates an operating voltage to be supplied to the second load 36. In the present embodiment, a second load system ES2 is provided by the second DDC 14 provided on a side closer to the second load 36 than the switch unit 20, and the second load 36. The first load system ES1 is connected to the second load system ES2 via the switch unit 20. Note that in the present embodiment, the second DDC 14 corresponds to a "second voltage generation unit".

A first current detection unit 22 and a second current detection unit 24 are provided on the connection path LT. The first current detection unit 22 is provided at a portion between an intermediate point PB of the first switch SW1 and the second switch SW2, and the first switch SW1 on the connection path LT, and detects a magnitude and a direction of a current flowing through the portion. The second current detection unit 24 is provided at a portion between the intermediate point PB and the second switch SW2 on the connection path LT, and detects a magnitude and a direction of a current flowing through the portion. Detection values of the current detection units 22 and 24 are input to the control unit 40.

Note that positions where the first and the second current detection units 22 and 24 are provided on the connection path LT are not limited to the above positions, and the first current detection unit 22 may be provided, for example, on a side closer to the first load system ES1 than the first switch SW1 on the connection path LT. Further, the second current detection unit 24 may be provided on a side closer to the second load system ES2 than the second switch SW2 on the connection path LT.

The control unit 40 acquires a charge amount SA of the low-voltage storage battery 16 via a battery monitoring device which is not illustrated. The control unit 40 generates first and second switch signals SC1 and SC2 to perform operation of switching states of the first and the second switches SW1 and SW2, and outputs the generated first and second switch signals SC1 and SC2 to the first and the second switches SW1 and SW2. The control unit 40 generates first and second control signals SD1 and SD2 to control operation of the first and the second DDCs 12 and 14, and outputs the generated first and the second control signals SD1 and SD2 to the first and the second DDCs 12 and 14. States of the first and the second DDCs 12 and 14 are switched between an operating state and an operation stopped state by the first and the second control signals SD1 and SD2.

Further, the control unit 40 is connected to a notification unit 44, an IG switch 45, and an input unit 46 and controls these. The notification unit 44 is a device that visually or auditorily notifies the driver and is, for example, a display and a speaker provided in a vehicle interior. The IG switch 45 is a start switch of the vehicle. The control unit 40 monitors an on/off state of the IG switch 45. The input unit 46 is a device that accepts operation by the driver and is, for example, a steering wheel, a lever, a button, a pedal, and a speech input device.

The control unit 40 performs control so that the vehicle performs manual driving and autonomous driving using the specific load 32 and the notification unit 44 described above. The control unit 40 includes a well-known microcomputer including a CPU, a ROM, a RAM, a flash memory, and the like. The CPU implements various functions for manual driving and autonomous driving with reference to arithmetic programs and control data in the ROM.

Note that manual driving represents a state where driving of the vehicle is controlled through operation by the driver. Further, autonomous driving represents a state where driving of the vehicle is controlled not in accordance with operation by the driver but in accordance with control by the control unit 40. Specifically, autonomous driving refers to autonomous driving of a level equal to or higher than level 3 among autonomous driving levels from level 0 to level 5 defined by National Highway Traffic Safety Administration (NHTSA). Level 3 is a level in which the control unit 40 controls both operation of a steering wheel and acceleration/deceleration while monitoring a traveling environment.

In autonomous driving, the control unit 40 determines whether a failure has occurred in the first load system ES1 and the second load system ES2 and in a case where it is determined that a failure has occurred in neither of the systems ES1 and ES2, controls the vehicle to perform autonomous driving using the first load 34 and the second load 36. By this means, the first and the second loads 34 and 36 cooperate to implement one function necessary for autonomous driving. Here, a failure refers to, for example, an abnormality such as an earth fault and a disconnection.

Meanwhile, in a case where it is determined that a failure has occurred in one of the systems ES1 and ES2, the switch unit 20 is turned off by turning off at least one of the first and the second switches SW1 and SW2 so as to separate the first load system ES1 from the second load system ES2. By this means, even in a case where a failure has occurred in one of the systems ES1 and ES2, it is possible to secure functions necessary for autonomous driving by the loads 32 and 34 on a side of the system in which no failure has occurred and continue autonomous driving.

By the way, in a case where the switch unit 20 is turned off, if means for supplying power to the load 32 or 34 on a side of the system in which no failure has occurred is only the first or the second DDC 12 or 14, it is difficult to perform power supply with less voltage fluctuation to the corresponding load 34 or 36, so that it is impossible to continue autonomous driving. The first and the second DDCs 12 and 14 step down and generate an operating voltage, and thus, requires a conversion period during which a rated voltage of the high-voltage storage battery 10 is stepped down to the operating voltage, so that it is impossible to make an inrush current upon start of operation large. Thus, in a case where the corresponding load 34 or 36 includes a load with a large inrush current, the operating voltage fluctuates due to lack of an inrush current, so that it is impossible to continue autonomous driving.

In this case, by providing the low-voltage storage battery 16 as an electric storage device that can perform power supply with less voltage fluctuation, it becomes possible to continue autonomous driving. However, for example, if the low-voltage storage battery 16 is provided for each of the systems ES1 and ES2, so that power supply with less voltage fluctuation can be performed to the load 34 or 36 on a side of the system in which no failure has occurred even in a case where a failure has occurred in either of the systems ES1 and ES2, a configuration of the power supply system 100 becomes complicated.

In the present embodiment, the low-voltage storage battery 16 is connected at the intermediate point PB of the switch unit 20. Thus, even in a case where a failure has occurred in one of the systems ES1 and ES2, it becomes possible to perform power supply with less voltage fluctuation to the load 34 or 36 on a side of the system in which no failure has occurred, so that it becomes possible to simplify the configuration compared to a configuration where the low-voltage storage battery 16 is provided for each of the systems ES1 and ES2. It is therefore possible to simplify the configuration of the power supply system 100 and perform power supply with little fluctuation in power even upon occurrence of a failure. Note that in the present embodiment, the low-voltage storage battery 16 corresponds to "an electric storage device" and "a first electric storage device".

Figure 2:
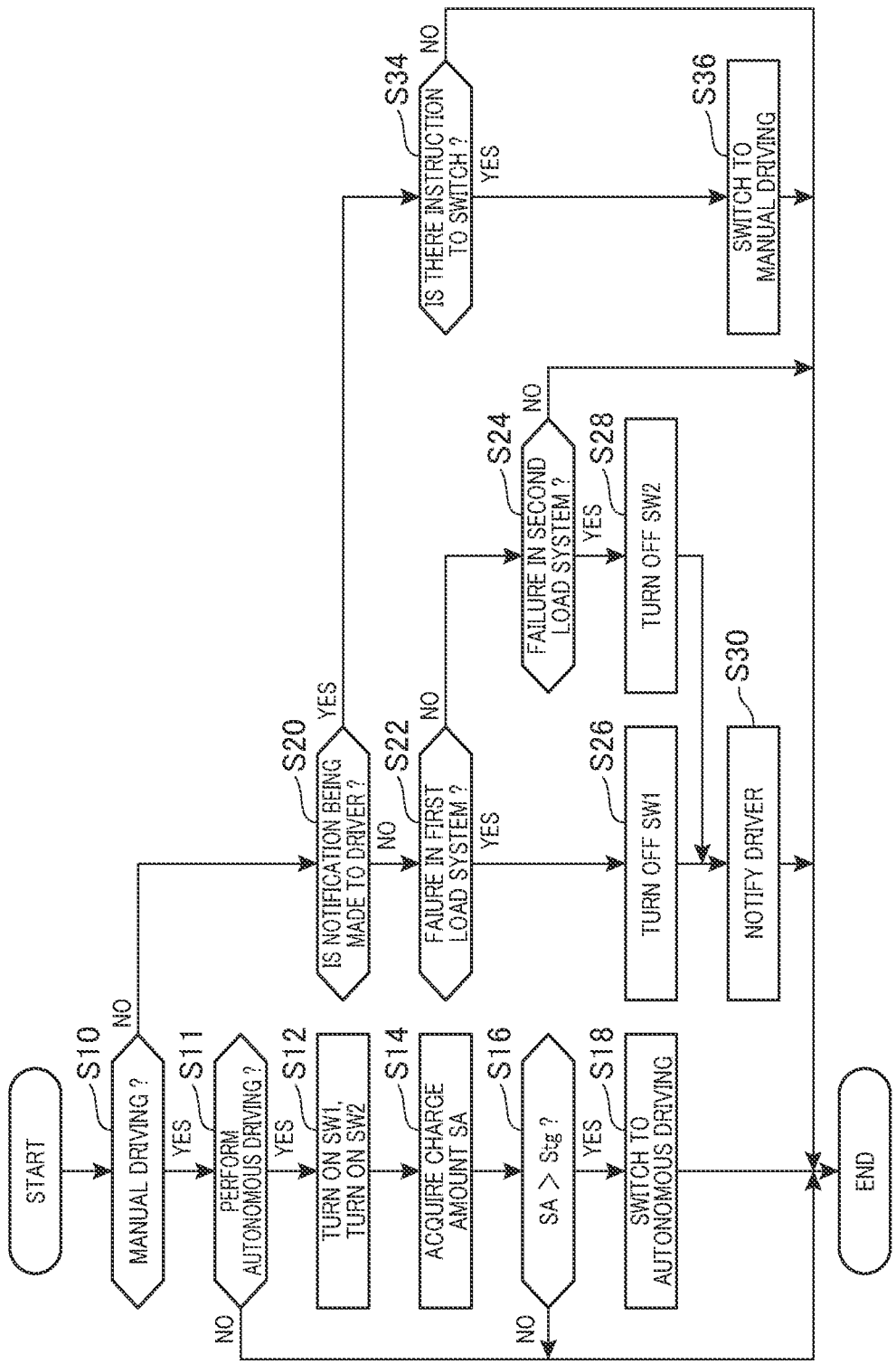
FIG. 2 is a flowchart illustrating procedure of control processing according to the first embodiment.

FIG. 2 illustrates a flowchart of control processing of the present embodiment. The control unit 40 repeatedly performs the control processing at intervals of a predetermined period if the state of the IG switch 45 is switched to an on state. Note that at the beginning of switching to the on state of the IG switch 45, the driver manually drives the vehicle.

If the control processing is started, first, in step S10, it is determined whether driving control of the vehicle is manual driving. If a positive determination result is obtained in step S10, that is, if driving control is manual driving, in step S11, it is determined whether to perform autonomous driving. For example, in a case where a failure has occurred in the first load system ES1 or the second load system ES2, preconditions for performing autonomous driving are not satisfied, and thus, a negative determination result is obtained in step S11, and the control processing is finished.

On the other hand, in a case where an autonomous driving instruction is issued in the vehicle, and no above-described failure has occurred, preconditions for performing autonomous driving are not satisfied, and thus a positive determination result is obtained in step S11. In this case, in step S12, the first switch SW1 and the second switch SW2 are turned on. Note that in a case where the first switch SW1 and the second switch SW2 have already been turned on in the previously performed control processing, the states are maintained.

In step S14, the charge amount SA of the low-voltage storage battery 16 is acquired. In the subsequent step S16, it is determined whether the charge amount SA acquired in step S14 is greater than a reference value Stg. If a negative determination result is obtained in step S16, the control processing is finished.

If a positive determination result is obtained in step S16, in step S18, driving control of the vehicle is switched from manual driving to autonomous driving, and the control processing is finished. Driving control is switched to autonomous driving, for example, in a case where an instruction of autonomous driving is input from the driver via the input unit 46. If driving control is switched to autonomous driving, it becomes a first state in which power is supplied from the first DDC 12 and the low-voltage storage battery 16 to the first load 34, and power is supplied from the second DDC 14 and the low-voltage storage battery 16 to the second load 36. Note that in the present embodiment, the processing in step S18 corresponds to a "first state control unit".

On the other hand, if a negative determination result is obtained in step S10, that is, if driving control is autonomous driving, in step S20, it is determined whether a notification is being made to the driver. Here, a notification made to the driver is a notification of occurrence of a failure in the first load system ES1 or the second load system ES2 to the driver and a notification of cancelling autonomous driving to the driver to encourage the driver to switch driving control to manual driving.

If a negative determination result is obtained in step S20, in step S22 and S24, it is determined whether a failure has occurred in the first load system ES1 or the second load system ES2. Specifically, in step S22, it is determined whether a failure has occurred in the first load system ES1. If a negative determination result is obtained in step S22, in step S24, it is determined whether a failure has occurred in the second load system ES2. Note that in the present embodiment, the processing in step S22 and S24 corresponds to a "failure determination unit".

In a case where it is determined that a failure has occurred in neither of the systems ES1 and ES2, a negative determination result is obtained in step S24. In this case, the control processing is finished, and driving control of the vehicle is continued using the first load 34 and the second load 36.

On the other hand, in a case where it is determined that a failure has occurred in one of the systems ES1 and ES2, a switch on a side of the system in which the failure has occurred out of the first switch SW1 and the second switch SW2 is turned off, and power supply to the side of the system in which the failure has occurred is stopped. Specifically, if a positive determination result is obtained in step S22, in step S26, the first switch SW1 is turned off, and a state of the first DDC 12 is switched to an operation stopped state. Further, if a positive determination result is obtained in step S24, in step S28, the second switch SW2 is turned off, and a state of the second DDC 14 is switched to an operation stopped state.

Note that in step S26 and S28, an on state of the switch on a side of the system in which no failure has occurred is maintained. By this means, it becomes a second state in which power is supplied from the low-voltage storage battery 16 to the load 34 or 36 on a side of the system in which no failure has occurred. Note that in the present embodiment, the processing in step S22 and S24 corresponds to a "second state control unit".

Note that occurrence of a failure can be detected by magnitudes and directions of currents detected at the first and the second current detection units 22 and 24. For example, in a case where an earth fault occurs in the first load system ES1, directions of current values detected at the first and the second current detection units 22 and 24 are directions from the second load system ES2 to the first load system ES1, and magnitudes of the currents detected at the first and the second current detection units 22 and 24 are larger than a predetermined normal current range. The control unit 40 can determine that a failure has occurred in the first load system ES1 in a case where the magnitudes and the directions of the currents detected at the first and the second current detection units 22 and 24 satisfy the above-described conditions.

If the first switch SW1 or the second switch SW2 is turned off in step S26 and S28, in step S30, the driver is notified of cancellation of autonomous driving via the notification unit 44. In other words, in a case where the state transitions from the first state (S18) to the second state (S26, S28) during autonomous driving, the driver is notified of cancellation of autonomous driving, and the control processing is finished. Note that in the present embodiment, the processing in step S30 corresponds to a "notification processing unit".

On the other hand, if a positive determination result is obtained in step S20, that is, a notification is being made to the driver, in step S34, it is determined whether an instruction to switch to manual driving is input from the driver via the input unit 46. In other words, it is determined whether a response to the notification is made from the driver. If a negative determination result is made in step S34, the control processing is finished, and autonomous driving of the vehicle is continued using the load 34 or 36 on a side of the system in which no failure has occurred.

On the other hand, if a positive determination result is obtained in step S34, in step S36, driving control of the vehicle is switched from autonomous driving to manual driving, and the control processing is finished. Note that in the present embodiment, the processing in step S28 corresponds to a "driving control unit".

Figure 3:
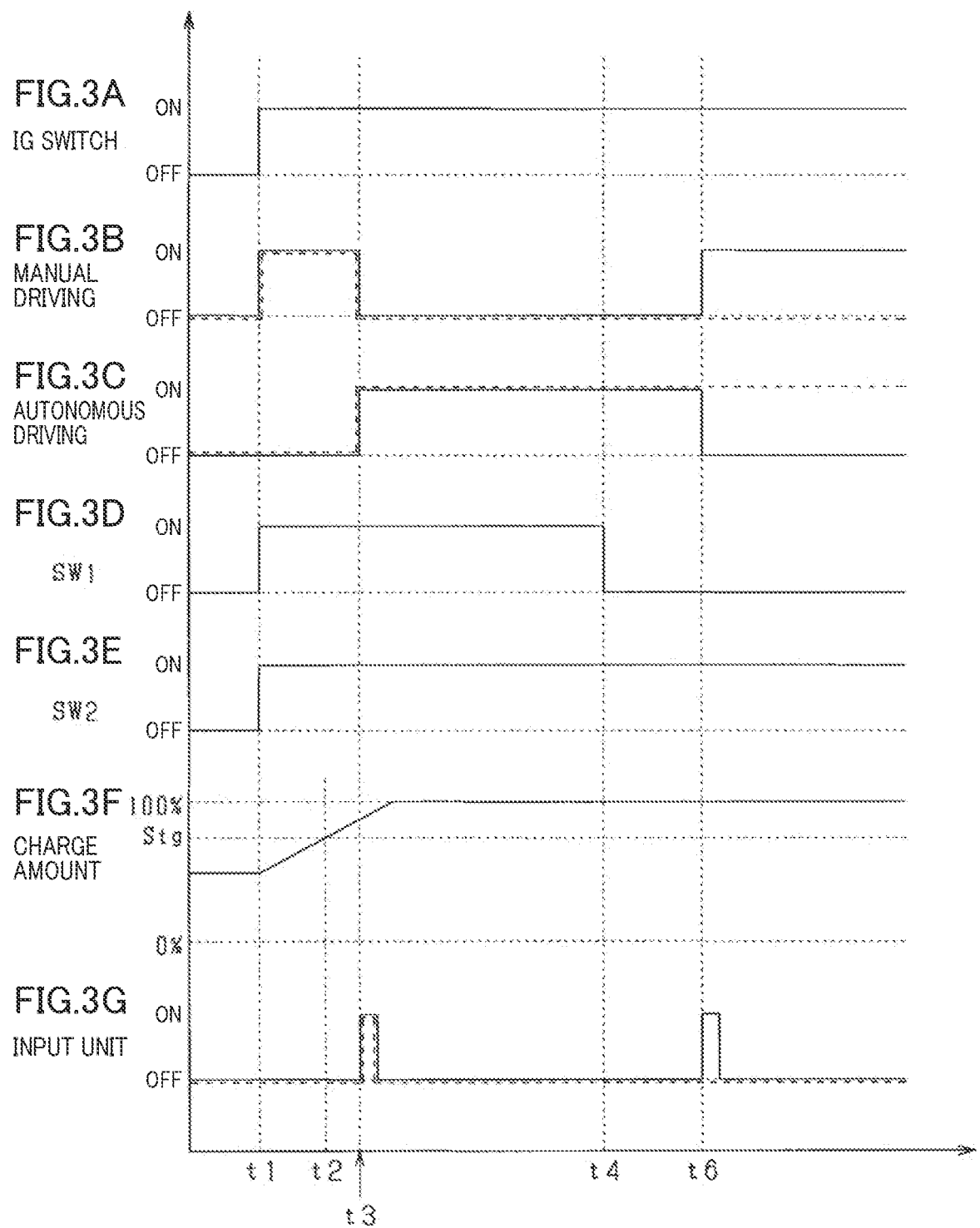
FIGS. 3A to 3G are a joint timing chart illustrating an example of the control processing according to the first embodiment.

Subsequently, FIGS. 3A to 3G illustrates an example of the control processing. FIGS. 3A to 3G illustrates transition of states of the first switch SW1 and the second switch SW2 in a case where a failure has occurred in the first load system ES1 during autonomous driving. FIG. 3A indicates transition of a state of the IG switch 45, FIG. 3B indicates a state of implementation of manual driving, and FIG. 3C indicates a state of implementation of autonomous driving. Note that in FIG. 3B and FIG. 3C, a state where each kind of driving is implemented is indicated as "on", and a state where each kind of driving is not implemented is indicated as "off".

Further, FIG. 3D indicates transition of a state of the first switch SW1, and FIG. 3E indicates transition of a state of the second switch SW2. FIG. 3F indicates transition of the charge amount SA of the low-voltage storage battery 16, and FIG. 3G indicates whether an instruction is input from the driver via the input unit 46. Note that in FIG. 3G, a state where an instruction is input from the driver is indicated as "on", and a state where an instruction is not input is indicated as "off".

Note that in FIG. 3B, FIG. 3C and FIG. 3G, in a case where a failure has occurred in the first load system ES1 during autonomous driving, transition of each value in a case where an instruction to switch to manual driving is input from the driver is indicated with a solid line, and transition of each value in a case where an instruction to switch is not input is indicated with a dashed line.

As illustrated in FIGS. 3A to 3G, if the IG switch 45 is turned on at time t1, the first switch SW1 and the second switch SW2 are turned on. In the present embodiment, the charge amount SA of the low-voltage storage battery 16 is smaller than the reference value Stg at time t1 by discharging of the low-voltage storage battery 16 during a period while the IG switch 45 is in an off state.

Then, the charge amount SA increases by charging via the first and the second switches SW1 and SW2. Then, the charge amount SA becomes greater than the reference value Stg at time t2, and then, if an instruction to perform autonomous driving is input from the driver via the input unit 46 at subsequent time t3, driving control of the vehicle is switched from manual driving to autonomous driving at time t3.

It is determined whether a failure has occurred in the first load system ES1 or the second load system ES2 during autonomous driving. In a case where it is determined that a failure has occurred in neither of the systems ES1 and ES2, on states of the first switch SW1 and the second switch SW2 are maintained. By this means, power is supplied respectively from the first and the second DDCs 12 and 14 and the low-voltage storage battery 16 to the first and the second loads 34 and 36. Power supply from the first and the second DDCs 12 and 14 enables continuous power supply even during autonomous driving for a long period of time, and power supply from the low-voltage storage battery 16 enables power supply with less voltage fluctuation. As a result, autonomous driving using the first load 34 and the second load 36 is performed during a period from time t3 to time t4.

In a case where it is determined that a failure has occurred in one of the systems ES1 and ES2, a switch on a side of the system in which the failure has occurred is turned off. In the present embodiment, it is determined that a failure has occurred in the first load system ES1 at time t4, and the first switch SW1 on a side of the system in which the failure has occurred is turned off at time t4. By this means, the first load system ES1 is separated from the second load system ES2, and the failure occurring in the first load system ES1 is prevented from affecting the second load system ES2.

Further, the state of the first DDC 12 on a side of the system in which the failure has occurred is switched to an operation stopped state at time t4. This can prevent influence of the failure in the first load system ES1.

On the other hand, an on state of the second switch SW2 on a side of the system in which no failure has occurred is maintained. Thus, when autonomous driving is continued using the second load 36 on a side of the system in which no failure has occurred, power supply with less voltage fluctuation can be performed from the low-voltage storage battery 16 to the second load 36.

As indicated with the solid line in FIGS. 3A to 3G, if an instruction to switch is input from the driver via the input unit 46 at subsequent time t6, driving control of the vehicle is switched from autonomous driving to manual driving. On the other hand, as indicated with the dashed line in FIGS. 3A to 3G, if an instruction to switch is not input from the driver, autonomous driving using the second load 36 is continued.

Note that in the present embodiment, the second DDC 14 is provided in the second load system ES2, and even in a case where a failure has occurred in the first load system ES1, continuous power supply from the second DDC 14 to the second load 36 is maintained. Thus, even if autonomous driving using the second load 36 is continued, the charge amount SA at the low-voltage storage battery 16 is prevented from decreasing.

According to the present embodiment described in detail above, the following effects can be obtained.

The power supply system 100 includes the first load 34 and the second load 36 as the specific loads 32 that implement at least one function necessary for autonomous driving. The switch unit 20 is provided on the connection path LT that connects the first load 34 and the second load 36, and in a case where a failure has occurred in the first load system ES1 or the second load system ES2, autonomous driving is continued by turning off the switch unit 20 and securing functions necessary for autonomous driving by the load 34 or 36 on a side of the system in which no failure has occurred.

In the present embodiment, in the above configuration, it is possible to supply power from the first DDC 12 and the low-voltage storage battery 16 to the first load 34 and supply power from the second DDC 14 and the low-voltage storage battery 16 to the second load 36 during autonomous driving. It is therefore possible to achieve stable power supply to the first load 34 and the second load 36 over a long period of time. In other words, power supply from the first and the second DDCs 12 and 14 enables continuous power supply even during autonomous driving for a long period of time, and power supply from the low-voltage storage battery 16 enables power supply with less voltage fluctuation.

Further, while power is supplied only to the load 34 or 36 in one of the first load system ES1 and the second load system ES2 upon occurrence of a failure in one of the systems during autonomous driving, power can be supplied to the both loads from the low-voltage storage battery 16. Thus, even if a failure occurs at an arbitrary timing during autonomous driving, it is possible to suitably handle the failure. Specifically, the low-voltage storage battery 16 is connected to the intermediate point PB of the first switch SW1 and the second switch SW2, and thus, even in a case where a failure has occurred in one of the systems ES1 and ES2, power supply with less voltage fluctuation can be performed to the load 34 or 36 on a side of the system in which no failure has occurred. Further, it is possible to simplify the configuration compared to the configuration where the low-voltage storage battery 16 is provided for each of the systems ES1 and ES2. It is therefore possible to perform power supply with little fluctuation in power even upon occurrence of a failure while simplifying the configuration of the power supply system 100.

In the present embodiment, the first and the second DDCs 12 and 14 are provided in the power supply system 100, and the DDCs are provided in both the first load system ES1 and the second load system ES2. Thus, even upon occurrence of a failure in one of the systems, it is possible to perform continuous power supply by power supply from the first DDC 12 or the second DDC 14, so that it is possible to smoothly switch driving control to manual driving regardless of the charge amount SA of the low-voltage storage battery 16.

In the present embodiment, upon occurrence of a failure during autonomous driving, autonomous driving is continued by using only one of the first load 34 and the second load 36, and the driver is notified of cancellation of autonomous driving. Then, driving control is switched to manual driving with acknowledgement of cancellation of autonomous driving by the driver. This enables continuation of autonomous driving immediately after occurrence of a failure and enables appropriate transition to driving by the driver.

In the present embodiment, when a failure has occurred in the first load system ES1 or the second load system ES2, power supply from the DDC 12 or 14 to the load system ES1 or ES2 for which it is determined that a failure has occurred is reduced. This can prevent influence of a failure in the load system in which a failure has occurred while continuing driving of the vehicle using the load system in which no failure has occurred.

Second Embodiment

Figure 4:
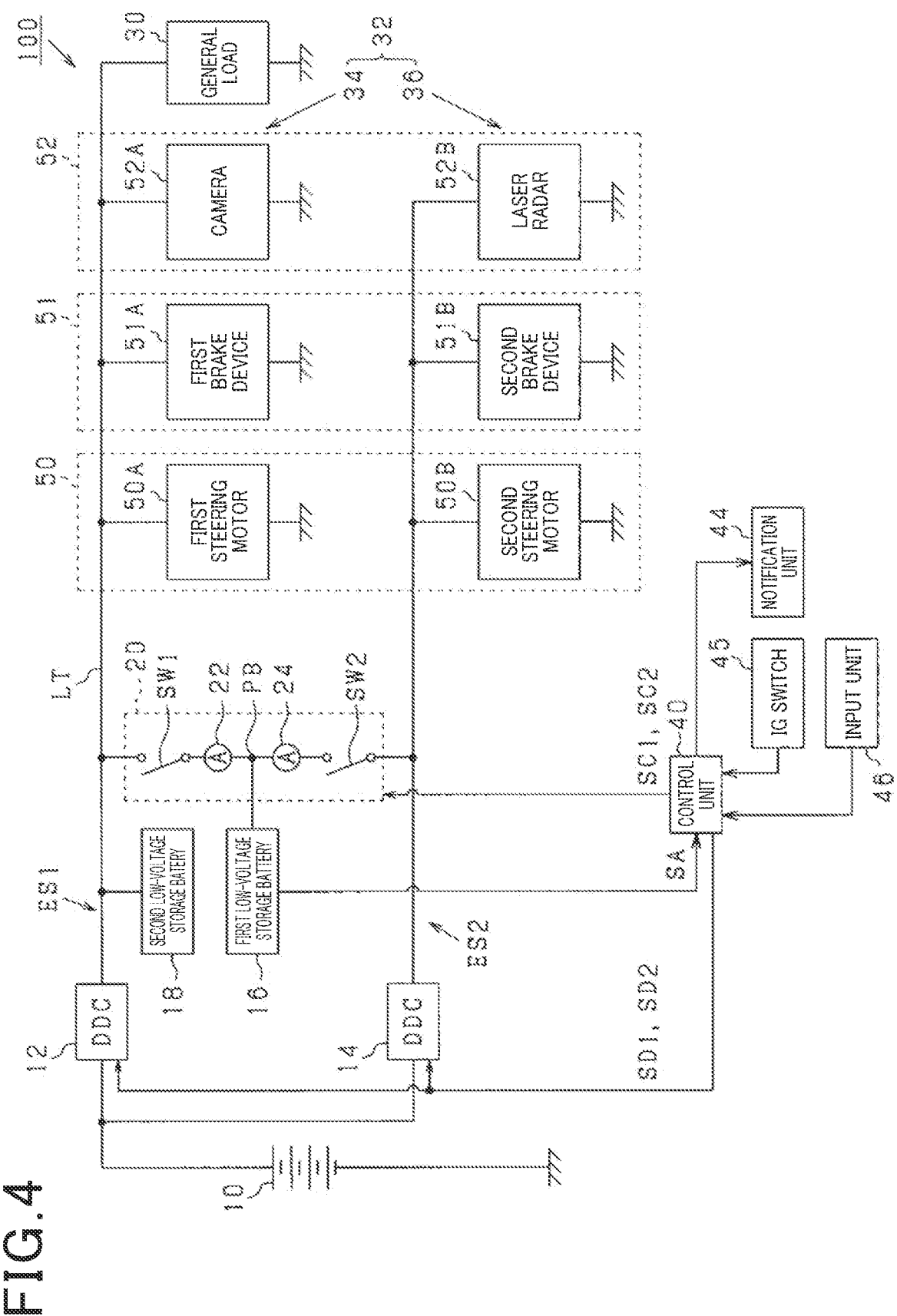
FIG. 4 is an overall configuration diagram of a vehicle-mounted power supply system according to a second embodiment.

A second embodiment will be described below with reference to FIG. 4 to FIG. 6, mainly concerning differences from the first embodiment. In FIG. 4, the same reference numerals will be assigned to components that are the same as the components illustrated in FIG. 1 above for the sake of convenience, and description will be omitted.

The present embodiment is different from the first embodiment in that a low-voltage storage battery 18 is provided in the first load system ES1. In the following description, the low-voltage storage battery 16 will be referred to as a first low-voltage storage battery 16, and the low-voltage storage battery 18 will be referred to as a second low-voltage storage battery 18 to distinguish from each other.

The second low-voltage storage battery 18, which is an electric storage device that can perform power supply with less voltage fluctuation in a similar manner to the first low-voltage storage battery 16, is connected to the connection path LT. Note that in the present embodiment, the second low-voltage storage battery 18 corresponds to a "second electric storage device".

Thus, the first load system ES1 does not necessarily have to be connected to the first low-voltage storage battery 16. The present embodiment is different from the first embodiment in that the first switch SW1 is turned off in the first state.

Figure 5:
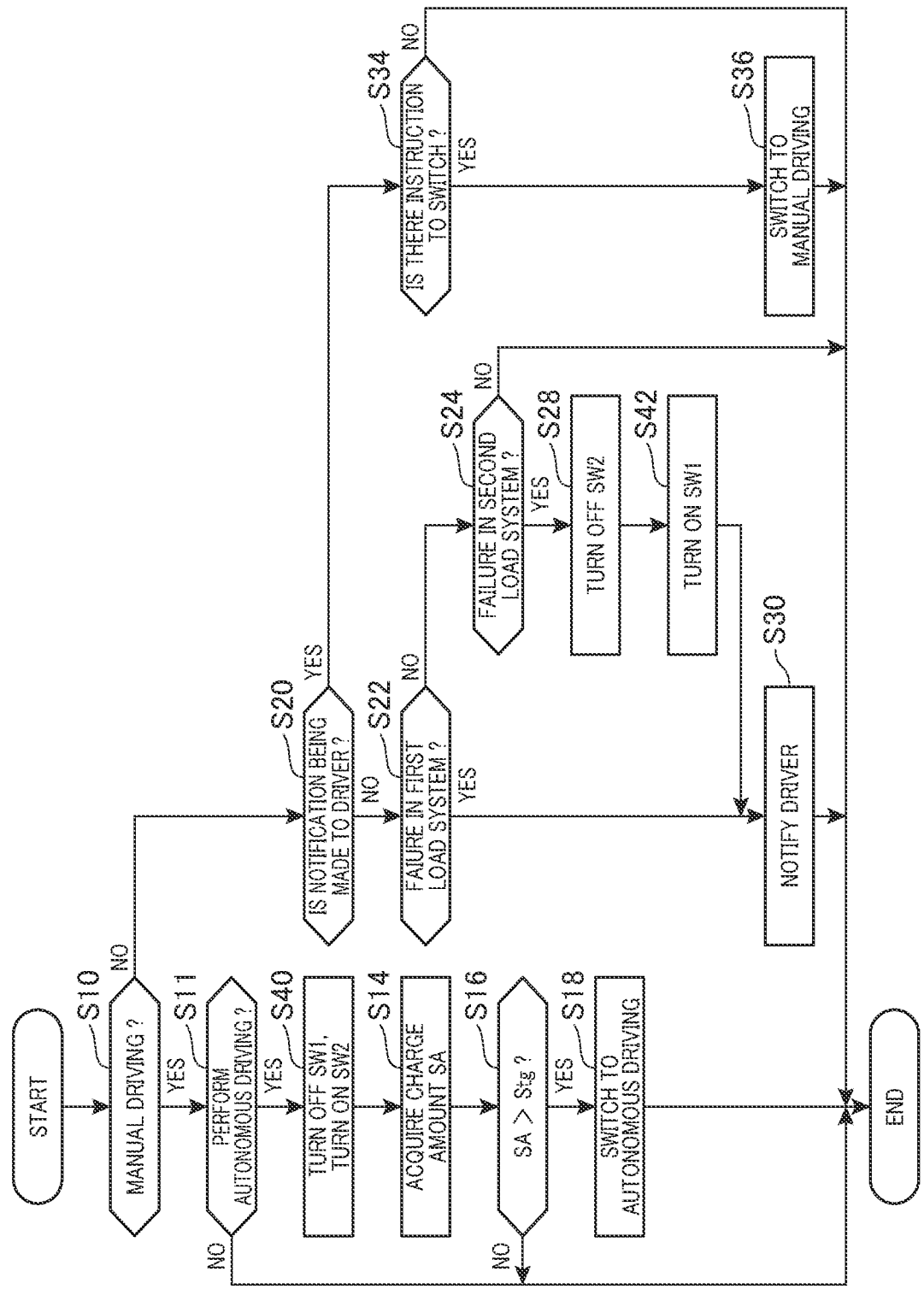
FIG. 5 is a flowchart illustrating procedure of control processing according to the second embodiment.
Figure 6:
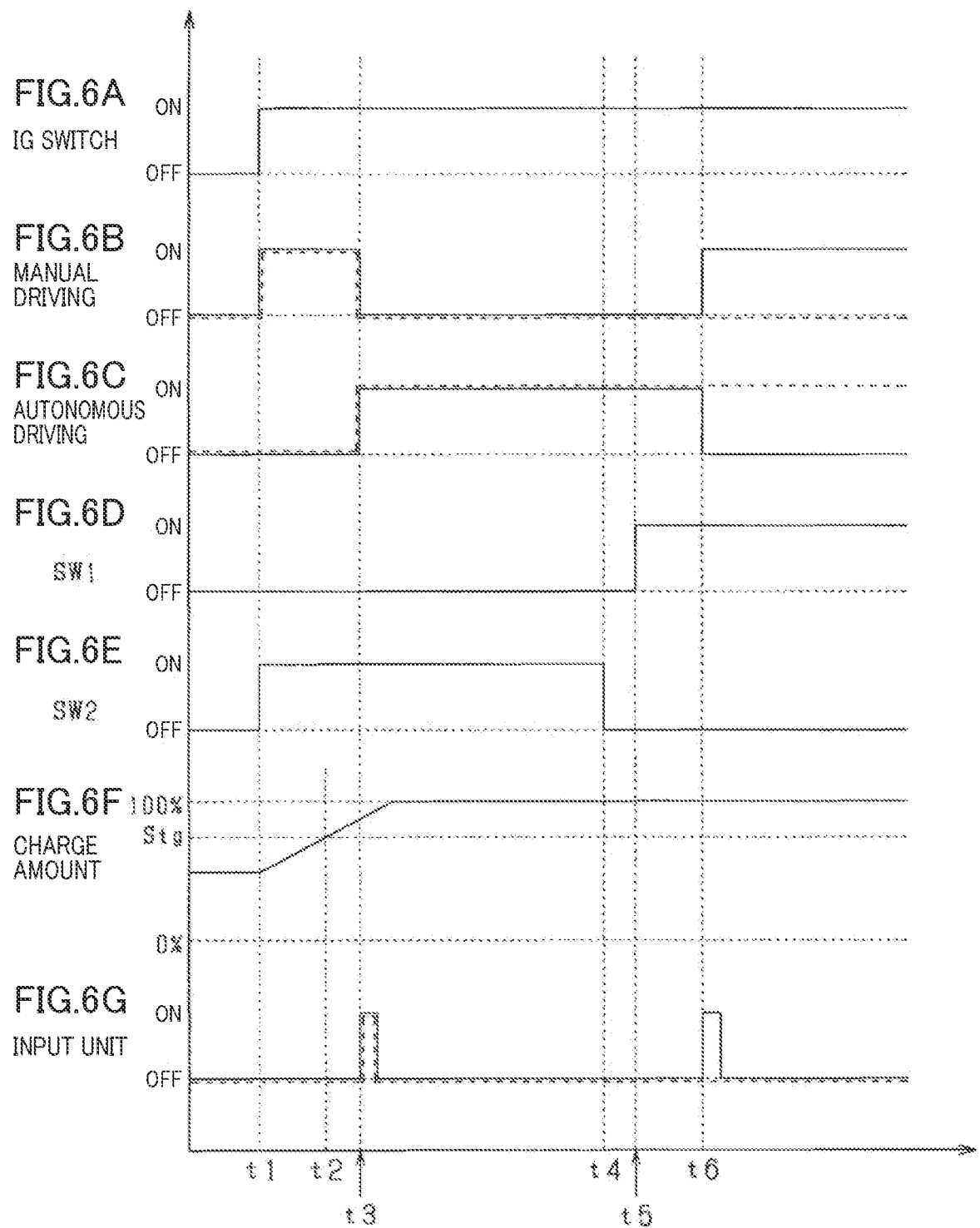
FIGS. 6A to 6G are a joint timing chart illustrating an example of the control processing according to the second embodiment.

FIG. 5 illustrates a flowchart of control processing of the present embodiment. In FIG. 5, the same step numbers will be assigned to processing that is the same as the processing illustrated in FIG. 2 above for the sake of convenience, and description will be omitted.

In the control processing of the present embodiment, if a positive determination result is obtained in step S11, in step S40, the first switch SW1 is turned off, and the second switch SW2 is turned on. Thus, the first state in step S18 becomes a state in which the first switch SW1 is in an off state, and the second switch SW2 is in an on state.

In the subsequent step S22 and S24, it is determined whether a failure has occurred in the first load system ES1 or the second load system ES2, and in a case where it is determined that a failure has occurred in one of the systems ES1 and ES2, a switch on a side of the system in which the failure has occurred out of the first switch SW1 and the second switch SW2 is turned off. In the present embodiment, in the first state in step S18, the first switch SW1 is in an off state, and the second switch SW2 is in an on state. Thus, in a case where a positive determination result is obtained in step S22, the processing proceeds to step S30 without states of the first and the second switches SW1 and SW2 being switched.

On the other hand, in a case where a positive determination result is obtained in step S24, the states of the both first and second switches SW1 and SW2 are switched. Specifically, the second switch SW2 is turned off in step S28, and the first switch SW1 is turned on in the subsequent step S42.

Subsequently, FIGS. 6A to 6G illustrates an example of control processing of the present embodiment. FIGS. 6A to 6G illustrates transition of the states of the first switch SW1 and the second switch SW2 in a case where a failure has occurred in the second load system ES2 during autonomous driving. In FIGS. 6A to 6G, description of transition that is the same as the transition illustrated in FIGS. 3A to 3G above will be omitted.

As illustrated in FIGS. 6A to 6G, if the IG switch 45 is turned on at time t1, the first switch SW1 is turned off, and the second switch SW2 is turned on. Then, if it is determined that a failure has occurred in the second load system ES2 at time t4 during autonomous driving, the second switch SW2 on a side of the system in which the failure has occurred is turned off at time t4, and then, the first switch SW1 on the opposite side is turned on at time t5.

According to the present embodiment described in detail above, the following effects can be obtained.

In the present embodiment, the second low-voltage storage battery 18 is provided in the first load system ES1, so that it is not necessary to supply power from the first low-voltage storage battery 16 to the first load 34. It is therefore possible to be the first state in which the first switch SW1 is in an off state and the second switch SW2 is in an on state during autonomous driving. In this first state, when a failure has occurred in the first load system ES1, the off state of the first switch SW1 is maintained, and the on state of the second switch SW2 is maintained. In other words, it is possible to prevent the failure occurring in the first load system ES1 from affecting the second load system ES2 without switching the states of the first switch SW1 and the second switch SW2.

Further, when a failure has occurred in the second load system ES2, the second switch SW2 is turned off, and then, the first switch SW1 is turned on. By turning off the second switch SW2 first, it is possible to suitably prevent the failure occurring in the second load system ES2 from affecting the first load system ES1, for example, prevent occurrence of fluctuation in an operating voltage of the first load 34 due to an earth fault occurring in the second load system ES2. Further, by turning on the first switch SW1 thereafter, it is possible to effectively utilize the first low-voltage storage battery 16 even when a failure has occurred in the second load system ES2.

Third Embodiment

Figure 7:
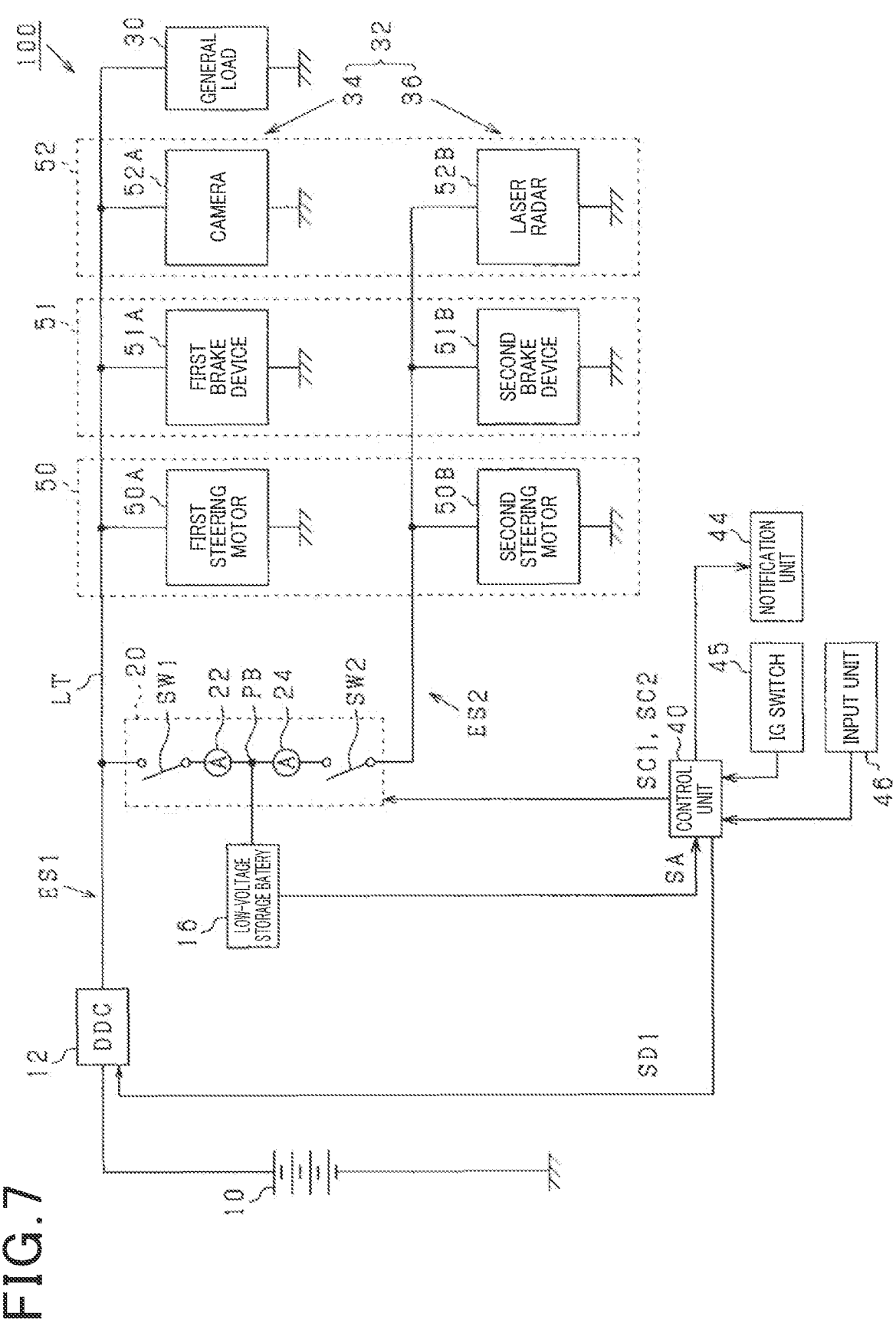
FIG. 7 is an overall configuration diagram of a vehicle-mounted power supply system according to a third embodiment.

A third embodiment will be described below with reference to FIG. 7 to FIG. 9 mainly concerning differences from the first embodiment. In FIG. 7, the same reference numerals will be assigned to components that are the same as the components illustrated in FIG. 1 above for the sake of convenience, and description will be omitted.

The present embodiment is different from the first embodiment in that the second DDC 14 is not provided in the second load system ES2. Thus, in a case where a failure has occurred in the first load system ES1 during autonomous driving, power is supplied only from the low-voltage storage battery 16 to the second load 36. While the low-voltage storage battery 16 can perform power supply with less voltage fluctuation, capacity of the low-voltage storage battery 16 is smaller than capacity of the high-voltage storage battery 10, and thus, if power supply is continuously performed, over discharge will occur, and traveling of the vehicle cannot be appropriately controlled. Thus, in the control processing of the present embodiment, processing for preventing over discharge of the low-voltage storage battery 16 is added.

Figure 8:
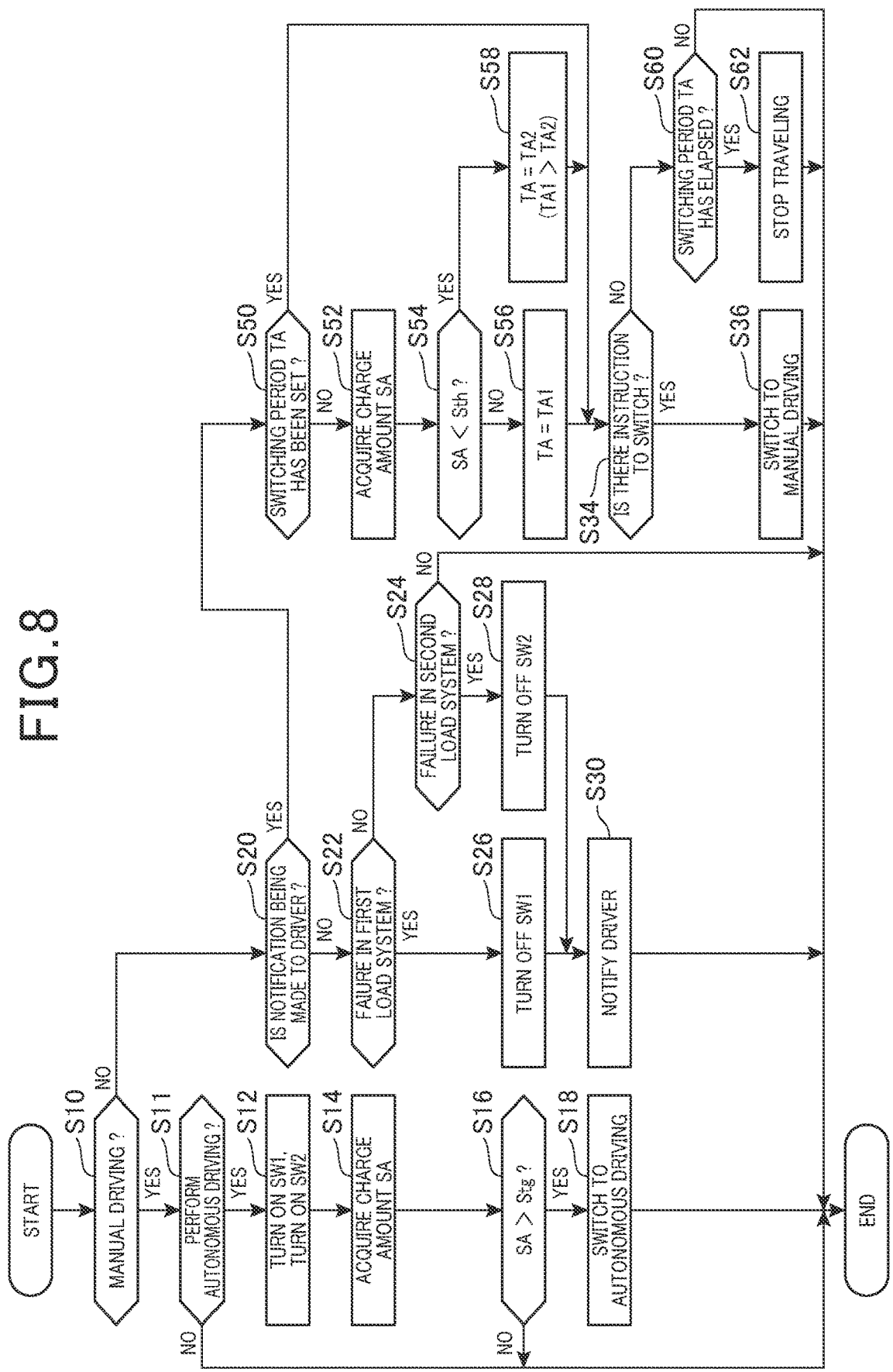
FIG. 8 is a flowchart illustrating procedure of control processing according to the third embodiment.
Figure 9:
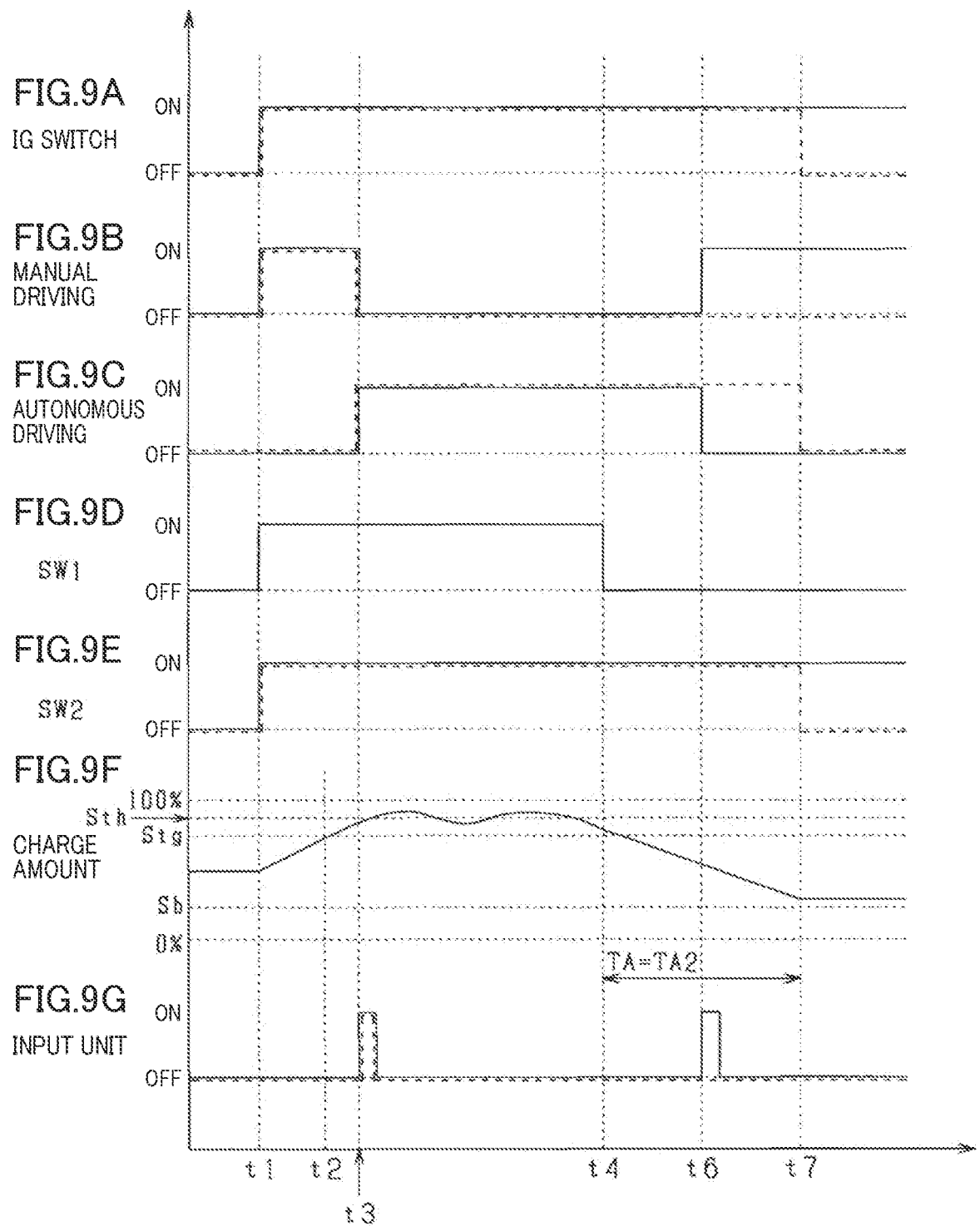
FIGS. 9A to 9G are a joint timing chart illustrating an example of the control processing according to the third embodiment.

FIG. 8 illustrates a flowchart of the control processing of the present embodiment. In FIG. 8, the same step numbers will be assigned to processing that is the same as the processing illustrated in FIG. 2 above for the sake of convenience, and description will be omitted.

In the control processing of the present embodiment, if a positive determination result is obtained in step S20, it is determined whether a switching period TA is set in step S50. Here, the switching period TA is a period during which a response from the driver is waited for after a notification is made to the driver and is set based on the charge amount SA of the low-voltage storage battery 16. If a positive determination result is obtained in step S50, the processing proceeds to step S34.

On the other hand, if a negative determination result is obtained in step S50, in step S52, the charge amount SA of the low-voltage storage battery 16 is acquired. In the subsequent step S54, it is determined whether the charge amount SA acquired in step S52 is smaller than a threshold Sth, and the switching period TA is set based on the determination result. Note that in the present embodiment, the processing in step S54 corresponds to a "determination unit".

Specifically, if a negative determination result is obtained in step S54, that is, in a case where it is determined that the charge amount SA is greater than the threshold Sth, in step S56, the switching period TA is set at a first period TA1. On the other hand, if a positive determination result is obtained in step S54, that is, in a case where it is determined that the charge amount SA is smaller than the threshold Sth, in step S58, the switching period TA is set at a second period TA2 which is shorter than the first period TA1. In other words, in the present embodiment, the switching period TA is set shorter in a case where it is determined that the charge amount SA is smaller than the threshold Sth than in a case where it is determined that the charge amount SA is greater than the threshold Sth.

If the switching period TA is set, in step S34, it is determined whether an instruction to switch to manual driving is input from the driver via the input unit 46. If a positive determination result is obtained in step S34, the processing proceeds to step S36. On the other hand, if a negative determination result is obtained in step S34, in step S60, it is determined whether the switching period TA has elapsed since a notification was made in step S30.

If a negative determination result is obtained in step S50, the control processing is finished. On the other hand, if a positive determination result is obtained in step S50, that is, in a case where there is no response from the driver within the switching period TA since a notification was made in step S30, in step S62, traveling of the vehicle is stopped, and the control processing is finished.

Subsequently, FIGS. 9A to 9G illustrates an example of the control processing of the present embodiment. FIGS. 9A to 9G illustrates transition of the states of the first switch SW1 and the second switch SW2 in a case where a failure has occurred in the first load system ES1 during autonomous driving. In FIGS. 9A to 9G, description of transition that is the same as the transition illustrated in FIGS. 3A to 3G above will be omitted.

Note that in FIG. 9A to FIG. 9C, FIG. 9E and FIG. 9G, transition of each value in a case where an instruction to switch to manual driving is input from the driver within the switching period TA in a case where a failure has occurred in the first load system ES1 during autonomous driving, is indicated with a solid line, and transition of each value in a case where an instruction to switch is not input is indicated with a dashed line.

As illustrated in FIGS. 9A to 9G, power is supplied from the first DDC 12 and the low-voltage storage battery 16 to the first and the second loads 34 and 36 respectively during autonomous driving from time t3. In the present embodiment, the second DDC 14 is not provided in the second load system ES2, and thus, the low-voltage storage battery 16 plays a role of supporting continuous power supply by the first DDC 12. Thus, the charge amount SA of the low-voltage storage battery 16 transitions at a value lower than 100%.

If it is determined at subsequent time t4 that a failure has occurred in the first load system ES1, and the first switch SW1 on a side of the system in which the failure has occurred is turned off, the charge amount SA decreases. In the present embodiment, the charge amount SA is lower than the threshold Sth at time t4, and thus, the switching period TA is set at the second period TA2 which is relatively short.

Thus, as indicated with the dashed line in FIGS. 9A to 9G, if an instruction to switch is not input from the driver until time t7 at which the second period TA2 has been elapsed since a notification was made to the driver at time t4, traveling of the vehicle is stopped at time t7. Specifically, the IG switch 45 is turned off, and the second switch SW2 is turned off. By this means, autonomous driving is finished, and traveling of the vehicle is stopped.

The charge amount SA decreases over the switching period TA, and if traveling of the vehicle is stopped at time t7, the charge amount SA is maintained at a value at time t7. In the present embodiment, the switching period TA is set at the second period TA2 which is relatively short, and thus, a decrease amount of the charge amount SA during the switching period TA is suppressed. Thus, at time t7 at which traveling of the vehicle is stopped, a situation is prevented where the charge amount SA decreases below an over discharge boundary value Sb of the low-voltage storage battery 16, and the low-voltage storage battery 16 is over-discharged.

According to the present embodiment described in detail above, the following effects can be obtained.

In the present embodiment, the second DDC 14 is not provided in the second load system ES2, and thus, in a case where a failure has occurred in the second load system ES2, power is supplied only from the low-voltage storage battery 16 to the second load 36. The low-voltage storage battery 16 is provided for the purpose of preventing fluctuation in operating voltage, and thus, very large capacity is not required, and small capacity is desired for making the power supply system 100 smaller. On the other hand, if the capacity of the low-voltage storage battery 16 is small, in the above-described case, over discharge of the low-voltage storage battery 16 will occur due to delay of a response from the driver, so that it is impossible to appropriately control traveling of the vehicle.

In the present embodiment, in a case where there is no response from the driver within the switching period TA since a notification was made to the driver, traveling of the vehicle is stopped. This can prevent over discharge of the low-voltage storage battery 16 and can appropriately control traveling of the vehicle while making the power supply system 100 smaller.

In the present embodiment, the switching period TA is provided based on the charge amount SA of the low-voltage storage battery 16. This can appropriately prevent the low-voltage storage battery 16 from being over-discharged even in a case where the charge amount SA of the low-voltage storage battery 16 is smaller than the threshold Sth upon occurrence of a failure during autonomous driving.

Other Embodiments

The present disclosure is not limited to the description of the above-described embodiments and may be implemented as follows.

The mobile object is not limited to a vehicle and may be, for example, a ship, an air vehicle, or the like.

The loads 34 and 36 may be, for example, the following devices.

The loads 34 and 36 may be a traveling motor that provides drive force to an engine and a drive circuit of the traveling motor. In this case, the first and the second loads 34 and 36 are respectively, for example, a three-phase permanent magnet synchronous motor and a three-phase inverter device.

The loads 34 and 36 may be antilock brake devices that prevent lock of wheels upon braking. In this case, the first and the second loads 34 and 36 are, for example, ABS actuators that can independently adjust a hydraulic pressure of the brake upon braking.

The loads 34 and 36 may be cruise control devices that detect a preceding vehicle that travels ahead of the own vehicle and maintain a constant distance between the own vehicle and the preceding vehicle in a case where the preceding vehicle is detected and cause the own vehicle to travel at vehicle speed set in advance in a case where the preceding vehicle is no longer detected. In this case, the first and the second loads 34 and 36 are, for example, millimeter-wave radars.

The loads 34 and 36 do not necessarily have to be a combination of the same components and may be a combination that implements equivalent functions by different types of equipment.

Figure 10:
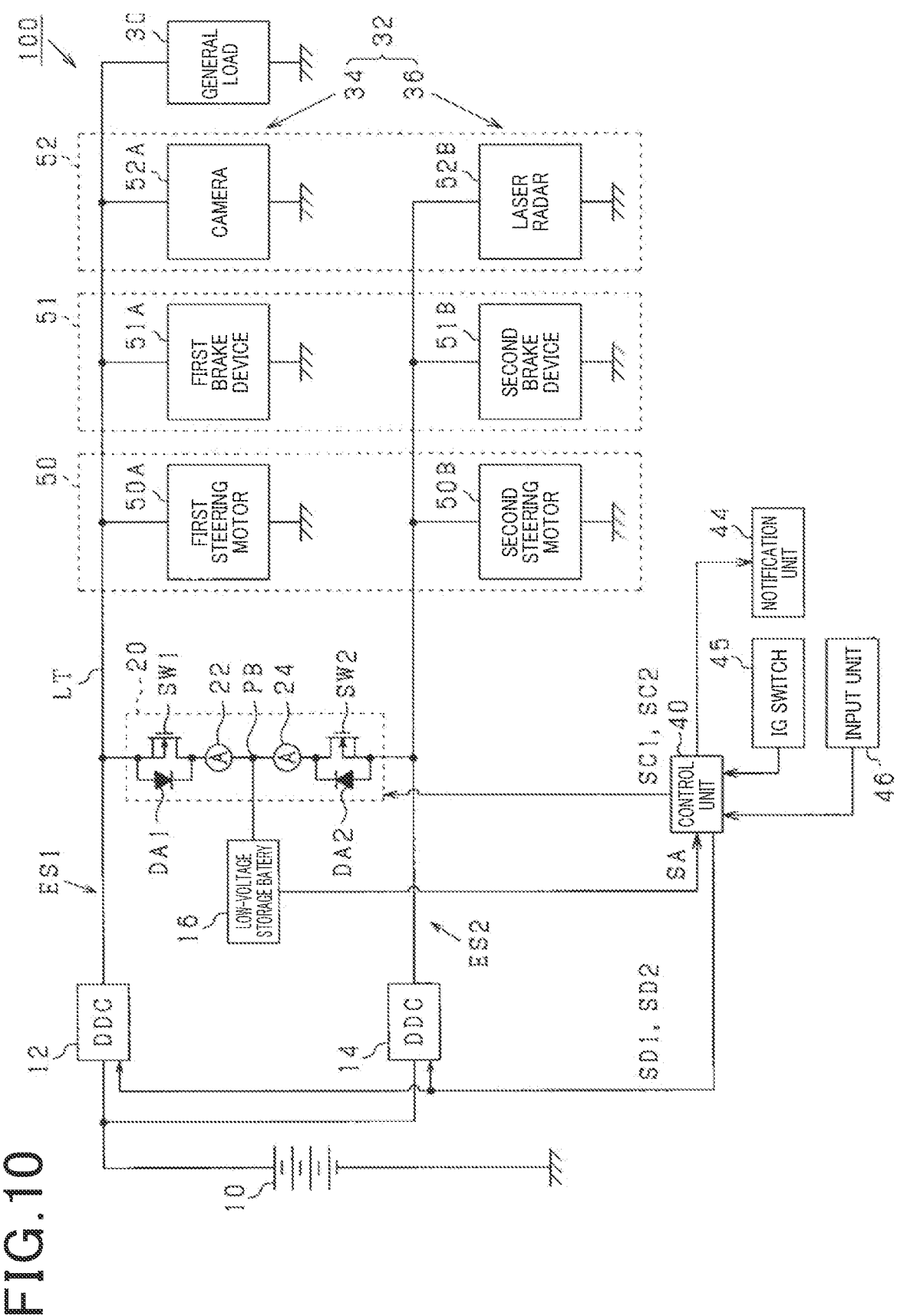
FIG. 10 is an overall configuration diagram of a vehicle-mounted power supply system according to other embodiments.

Each of the switches SW1 and SW2 is not limited to an IGBT, and, for example, as illustrated in FIG. 10, may be an N channel MOSFET (hereinafter, simply MOSFET) as a semiconductor switch. A parasitic diode is connected in parallel to the MOSFET.

Typically, in a case where the MOSFET is used as each of the switches SW1 and SW2, a configuration is employed where two MOSFETs are provided for each of the switches SW1 and SW2, and cathodes of the parasitic diodes connected in parallel to these MOSFETs are connected to each other. Thus, four MOSFETs are required for the first and the second switches SW1 and SW2, which makes a configuration complicated. In contrast, in the present embodiment, the configuration is simplified by reducing the number of the MOSFETs.

Specifically, the switches SW1 and SW2 are respectively constituted with one MOSFET, and a first parasitic diode DA1 connected in parallel to the first switch SW1 is disposed so that a direction from the first load 34 toward the low-voltage storage battery 16 becomes a forward direction. Thus, the low-voltage storage battery 16 can be charged by the first DDC 12 via the first parasitic diode DA1 regardless of the state of the first switch SW1.

Further, in the present embodiment, a second parasitic diode DA2 connected in parallel to the second switch SW2 is disposed so that a direction from the second load 36 toward the low-voltage storage battery 16 becomes a forward direction. In other words, an anode of the first parasitic diode DA1 is connected to an anode of the second parasitic diode DA2. Thus, the first load system ES1 can be electrically connected to the second load system ES2 by these parasitic diodes DA1 and DA2.

While in the above-described embodiment, an example has been described where the power supply system according to the present disclosure is applied to a vehicle that can travel by manual driving and autonomous driving, the present disclosure is not limited to this. The power supply system according to the present disclosure may be applied to either a vehicle that can travel only by autonomous driving such as a fully autonomous driving vehicle or a backup device in the vehicle that can travel only by manual driving.

For example, in a case where the power supply system according to the present disclosure is applied to a vehicle that can travel only by autonomous driving, if a failure has occurred in one of the systems, processing of stopping traveling of the vehicle or stopping the vehicle at a safe place by autonomous driving may be performed instead of processing of switching driving control to manual driving.

While an example has been described in the above-described embodiment where in a case where the control unit 40 determines that a failure has occurred in one of the systems ES1 and ES2, the control unit 40 performs operation to switch the states of the first and the second switches SW1 and SW2, the present disclosure is not limited to this. For example, in a case where the control unit 40 acquires information indicating that a failure has occurred in one of the systems ES1 and ES2, the control unit 40 may perform operation to switch the states of the first and the second switches SW1 and SW2 based on the information without performing determination. In this case, the information indicating that a failure has occurred in one of the systems ES1 and ES2 corresponds to "failure information", and the processing of the control unit 40 acquiring this information corresponds to an "information acquisition unit".

While an example has been described in the above-described embodiment where in a case where it is determined that a failure has occurred in one of the systems ES1 and ES2, power supply to a side of the system in which the failure has occurred is stopped, the present disclosure is not limited to this, and power supply to a side of the system in which the failure has occurred may be reduced.

The voltage generation unit is not limited to a DDC and may be, for example, an alternator.

The electric storage device may be a lithium ion battery, or a lead storage battery or a nickel-hydrogen storage cell.

A failure detection method is not limited to a detection method using a current. For example, a failure may be detected using a voltage.

While the present disclosure has been described with reference to the examples, it is understood that the present disclosure is not limited to the examples and structures. The present disclosure incorporates various modified examples and modifications within an equivalent range. In addition, various combinations, forms, and other combinations and forms including only one element or more or less elements fall within the scope and the scope of mind of the present disclosure.

What is claimed is:

1. A power supply system to be applied to a mobile object and including a first load and a second load as loads that implement at least one function necessary for driving of the mobile object, the power supply system comprising:
   an inter-load switch provided on a connection path that connects the first load and the second load and including a first switch and a second switch connected in series a first load system including the first load and a second load system including the second load being electrically connected by turning on the first switch and the second switch, and the first load system and the second load system being cut off by turning off one of the first switch and the second switch;
   a voltage generation unit connected to the connection path on a side of the connection path closer to the first load than to the second load and configured to generate an operating voltage of the first load and the second load;
   an electric storage device connected between the first switch and the second switch; and
   a processor programmed to:
      select a first state during driving, the first state being a state in which the first switch and the second switch are turned on and power is supplied from the voltage generation unit and the electric storage device to the first load and the second load;
      determine whether a failure has occurred in the first load system or the second load system during driving; and
      in a case where it has been determined that the failure has occurred, select a second state in which power is supplied from the electric storage device to a load on a side of a no-failure-occurrence system by (i) turning off a switch on a side of a failure-occurrence system out of the first switch and the second switch and (ii) turning on a switch on a side of the no-failure-occurrence system out of the first switch and the second switch,
   wherein of the first load system and the second load system, a system in which a failure has occurred is the failure-occurrence system and a system in which no failure has occurred is the no-failure-occurrence system.

2. The power supply system according to claim 1, wherein between (i) the side of the connection path closer to the first load and (ii) a side of the connection path closer to the second load than to the first load, the voltage generation unit is connected to the connection path only on the side of the connection path closer to the first load.

3. The power supply system according to claim 1, wherein:
   the mobile object is capable of traveling by manual driving and by autonomous driving, driving being switched from the autonomous driving to the manual driving in response to a determination that a failure has occurred during the autonomous driving;
   the processor is further programmed to:
      select the first state during the autonomous driving;
      determine whether a failure has occurred in the first load system or the second load system during the autonomous driving; and
      as the second state, turn off the first switch and turn on the second switch to supply power from the electric storage device to the second load, in response to the determination that the failure has occurred in the first load system; and
   after the second state is selected, traveling of the mobile object is stopped when a predetermined time has passed without driving having been switched from the autonomous driving to the manual driving.

* * * * *